United States Patent
Lee et al.

(10) Patent No.: US 12,106,347 B1
(45) Date of Patent: *Oct. 1, 2024

(54) SYSTEMS AND METHODS FOR DYNAMICALLY INGESTING AND MONITORING ONLINE PRODUCTS

(71) Applicant: CARMAX ENTERPRISE SERVICES, LLC, Richmond, VA (US)

(72) Inventors: David Meriwether Lee, Richmond, VA (US); Brantley Evans Gilbert, Mechanicsville, VA (US); Matthew David Reamer, Moseley, VA (US); Matthew James Morrison, Richmond, VA (US); Michael Jeffrey Pringle, Richmond, VA (US)

(73) Assignee: CARMAX ENTERPRISE SERVICES, LLC, Richmond, VA (US)

( * ) Notice: Subject to any disclaimer, the term of this patent is extended or adjusted under 35 U.S.C. 154(b) by 401 days.

This patent is subject to a terminal disclaimer.

(21) Appl. No.: 17/511,606

(22) Filed: Oct. 27, 2021

Related U.S. Application Data

(63) Continuation of application No. 16/826,679, filed on Mar. 23, 2020, now Pat. No. 11,170,424.

(51) Int. Cl.
*G06Q 30/0601* (2023.01)
*G06F 16/907* (2019.01)
(Continued)

(52) U.S. Cl.
CPC ....... *G06Q 30/0623* (2013.01); *G06F 16/907* (2019.01); *G06F 16/9532* (2019.01);
(Continued)

(58) Field of Classification Search
CPC ........... G06Q 30/0623; G06Q 30/0631; G06Q 30/0643; G06F 16/907; G06F 16/9532; G06N 20/00
See application file for complete search history.

(56) References Cited

U.S. PATENT DOCUMENTS 6,076,070 A   6/2000 Stack
7,120,595 B2  10/2006 Alexander
(Continued)

OTHER PUBLICATIONS

Feltenberger, Dave; Jan. 5, 2018; Semi-Supervised Classification Using Object Metadata https://ip.com/IPCOM/000252345, (Year: 2018).*

(Continued)

*Primary Examiner* — Michelle T Kringen
(74) *Attorney, Agent, or Firm* — Troutman Pepper Hamilton Sanders LLP; Christopher J. Forstner; Scott A. Bergeson

(57) ABSTRACT

A system includes one or more memory devices storing instructions, and one or more processors configured to execute the instructions to perform the steps of a method to dynamically ingest and monitor online products. The method may include receiving access to a webpage, determining whether the webpage includes a predetermined template, and in response to receiving the predetermined template, ingesting one or more product images and product metadata from the webpage. If no template is found, the system may request search engine optimization metadata to determine if at least one image is of a product before initializing a machine learning algorithm to determine whether the images correspond to product images. If no associated metadata is found, the system may request manual input of associated metadata before displaying, in real-time and in a standardized format, the ingested photos and metadata, allowing a user to select photos representing products of interest.

20 Claims, 11 Drawing Sheets

(51) Int. Cl.
   *G06F 16/9532*   (2019.01)
   *G06N 20/00*   (2019.01)
(52) U.S. Cl.
   CPC ......... *G06N 20/00* (2019.01); *G06Q 30/0631*
      (2013.01); *G06Q 30/0643* (2013.01)

(56) References Cited

U.S. PATENT DOCUMENTS

| | | |
|---|---|---|
| 8,510,298 B2 | 8/2013 | Khandelwal |
| 9,262,784 B2 | 2/2016 | Shi |
| 10,846,534 B1 | 11/2020 | Furlan et al. |
| 2006/0129463 A1* | 6/2006 | Zicherman ......... G06Q 30/0627 705/26.63 |
| 2011/0110572 A1 | 5/2011 | Guehring et al. |
| 2013/0058537 A1 | 3/2013 | Chertok et al. |
| 2015/0106233 A1 | 4/2015 | Mangaru et al. |
| 2020/0090001 A1* | 3/2020 | Zargahi ................... G06F 18/24 |
| 2020/0142941 A1* | 5/2020 | Box ................... G06F 16/9538 |
| 2020/0387946 A1 | 12/2020 | Otten |

OTHER PUBLICATIONS

Quartulli, M. et al., "A review of EO image information mining." ISPRS Journal of Photogrammetry and Remote Sensing 75: p11-28. 2013 (Year: 2013).

\* cited by examiner

FIG. 6C

SYSTEMS AND METHODS FOR DYNAMICALLY INGESTING AND MONITORING ONLINE PRODUCTS

CROSS REFERENCE TO RELATED APPLICATIONS

This application is a continuation of, and claims priority under 35 U.S.C. § 120 to, U.S. patent application Ser. No. 16/826,679, filed Mar. 23, 2020, the entire contents of which is fully incorporated herein by reference.

FIELD OF THE INVENTION

The present disclosure relates to system and methods for conducting online product comparison, and more particularly systems and methods for conducting online product comparison by saving product results from across multiple webpages in one location.

BACKGROUND

As users rely on the Internet more and more for their shopping needs, it has become increasingly difficult for users to make purchase decisions as users may become paralyzed by an overabundance of options. This is evident in the online automobile market, as users interested in a particular make and model will have to review thousands of product results online, compared to the several dozen of that make and model that may be available locally. Existing methods of tracking vehicles of interest, regardless of the source webpage, require the user to manually gather the desired details from each source webpage and enter all the vehicle data into a centralized location for later analysis, e.g., in an Excel spreadsheet or a handwritten notebook.

Accordingly, there is a need for improved systems and methods for dynamically ingesting and monitoring online products, allowing a user to standardize and store vehicle data regardless of the format of the data or the source webpage, and to receive dynamic updates when a change occurs with a vehicle listing.

SUMMARY

Disclosed embodiments provide systems and methods for dynamically ingesting and monitoring online products.

Consistent with the disclosed embodiments, a method for dynamically ingesting and monitoring online products. The method may begin with a user accessing a webpage on which one or more products may be listed for sale. The webpage may include webpage metadata. The system may receive the request to access the webpage from a user device, and may determine whether the webpage has an associated predetermined template that may allow the system to determine the location of any product images and associated product metadata stored on the webpage. If a predetermined template is located, the system may utilize the predetermined template to ingest the one or more product images and the metadata associated with the one or more product images. If the system determines that no predetermined template can be located on the webpage, the system may then request the webpage for search engine optimization metadata. The webpage metadata may include the search engine optimization metadata. The search engine optimization metadata may be used to run a primary analysis on the webpage to determine whether the search engine optimization metadata is indicative of at least one product within a probability threshold. When the search engine optimization metadata does not indicate at least one product, the system may determine whether the webpage references at least one product. The system may determine whether the webpage references at least one product by parsing webpage metadata. When the search engine optimization metadata indicates to the system that at least one product has been found on the webpage within the probability threshold or when the webpage references the at least one product, the system may analyze the webpage with a trained machine learning algorithm. The trained machine learning algorithm may be used to (i) determine whether one or more images on the webpage correspond to one or more product images and (ii) determine whether the webpage includes the associated product metadata corresponding to one or more product images. In response to determining that one or more images on the webpage correspond to one or more product images and that the one or more product images are missing their associated product metadata, the system may prompt a user to manually identify relevant fields on the webpage that correspond to the associated product metadata. However, in some instances, the system may utilize the trained machine learning algorithm to probabilistically determine the associated product metadata corresponding to the one or more product images before prompting the user to manually identify the relevant fields on the webpage. In some instances, some fields may be prefilled based on a best approximation provided by the trained machine learning algorithm. The system may then ingest the one or more product images and their associated product metadata from the webpage based on the trained machine learning algorithm analysis and the manual identification for display inside of an API that may operate on backend system server or remotely executed on a user device.

The system may standardize the format of the one or more product images and the product metadata such that the metadata and images are displayed in a convenient and easy-to-digest way, independent of the format of the images and metadata on the source webpage. In such a way, the user's ability to make sound decisions on which product to ultimately purchase is facilitated. After standardization, which may occur in substantially real-time, the system may configure the ingested one more product images and their associated product metadata for display in the standardized format. The standardization may include adding a user input mechanism (e.g., an interactive button) to each of the one or more product images, and/or allowing a user to select the product images corresponding to products of interest. The system may receive a user input indicating the user's selection of a product of interest. In response, the system may save the selected product image and its associated product metadata to a product repository. The system is further configured to dynamically monitor all products a user has selected for storage in the product repository, such that any changes to the product (e.g., in the case of a vehicle, the vehicle may have shipped from one dealership location from another, the listing price may have been reduced, the mileage may have increased, etc.) are reflected in the associated product metadata, which is updated on an ongoing basis in substantially real-time.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology, and together with the description, serve to explain the principles of the disclosed technology. In the drawings:

FIGS. 6A-6C depict an API for dynamically ingesting and monitoring online products, according to an exemplary embodiment.

DETAILED DESCRIPTION

Figure 1A:
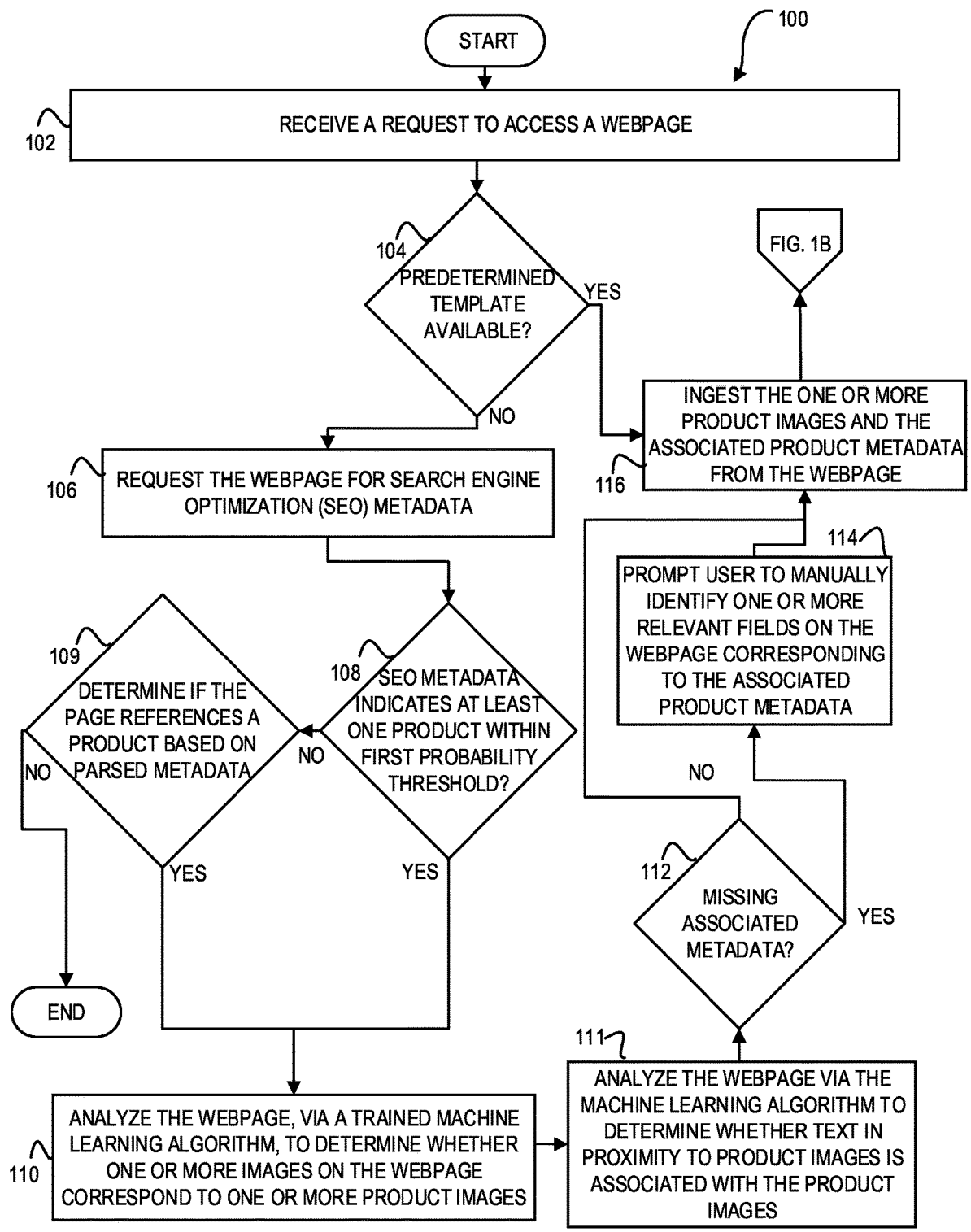
FIGS. 1A-1B are flowcharts of an exemplary method for dynamically ingesting and monitoring online products.

The present disclosure relates to system and methods for dynamically ingesting and monitoring online products, and more particularly systems and methods for dynamically ingesting and monitoring online products by ingesting product images and associated product metadata from one or more sources and continuously monitoring those products for any changes in their price, availability, and so on. For example, some implementations utilize a trained machine learning algorithm in order to expedited or even automated ingestion of product images and an associated product metadata, allowing a user to dynamically monitor selected products of interest for any changes. The method may include receiving a request to access a webpage, wherein the webpage includes webpage metadata. The method may further include determining whether the webpage includes a predetermined template. The predetermined template may include instructions for locating and ingesting one or more product images and the associated product metadata of the webpage metadata. In response to receiving the predetermined template from the webpage, the method may include ingesting one or more product images and the associated product metadata. In response to finding the webpage does not comprise a predetermined template, the method may further include requesting the webpage for search engine optimization metadata, wherein the webpage metadata comprises the search engine optimization metadata. The search engine optimization metadata may be indicative of at least one product within a first probability threshold. When the search engine optimization metadata is not indicative of at least one product within the first probability threshold, the method may include parsing the metadata of the webpage and determining whether the webpage references the at least one product based on the parsed webpage metadata. When the search engine optimization metadata is indicative of at least one product within the first probability threshold or when the webpage references the at least one product, the method may include analyzing the webpage, via a trained machine learning algorithm, to determine whether one or more images on the webpage correspond to one or more product images and whether the webpage includes the associated product metadata corresponding to the one or more product images. In response to determining that the one or more images on the webpage correspond to one or more product images and that the one or more product images are missing the associated product metadata, the method may include prompting a user to manually identify one or more relevant fields on the webpage that correspond to the associated product metadata. The method may further include ingesting one or more product images and the associated product metadata from the webpage based on the trained machine learning algorithm analysis and the manual identification. The method may include standardizing the ingested one or more product images and the associated product metadata. The method may also include configuring for display, in substantially real-time, the ingested one or more product images and the associated product metadata. The ingested one or more product images may be displayed in a standardized format independent of a format of the webpage. Each of the ingested one or more product images may have an associated user input mechanism presented in the standardized format. The method may further include receiving a user input based on an interaction with the user input mechanism associated with a first ingested product image and a first ingested product metadata. The user input may be indicative of a selection of the first ingested product image and the first ingested product metadata. The method may further include saving the first ingested product image and the first ingested product metadata into a product repository. Finally, the method may further include dynamically monitoring products stored in the product repository to changes to the first ingested product metadata.

In some embodiments, the one or more product images further include vehicle images and the trained machine learning algorithm is iteratively retrained based on the manual identification of the associated product metadata to recognize the one or more relevant fields on the webpage as indicative of the associated product metadata.

In some embodiments, the associated product metadata may include a make, a model, a year, a VIN, a product price, a mileage, a product location, a shipping fee, a webpage URL, or some combinations thereof. In some embodiments, the predetermined template includes dynamic queries that may be in the form of regular expression, DOM query, or XPath query.

In some embodiments, the method may further include generating an error message indicating that no product images have been identified in response to (i) determining that the one or more images on the webpage do not correspond to one or more product images and (ii) determining that the webpage does not include the associated product metadata. The method may further include generating an error message indicating that no product images corresponding to the associated product metadata have been identified in response to (i) determining that the one or more images on the webpage do not correspond to one or more product images and (ii) determining that the webpage includes the associated product metadata. The method may further include ingesting the one or more product images and the associated product metadata in response to (i) determining that the one or more images on the webpage correspond to one or more product images and (ii) determining that the webpage includes the associated product metadata corresponding to the one or more product images.

In some embodiments, the method may include an indication on the webpage for whether the first ingested product image has already been saved into the product repository. In some embodiments, the method may further include generating a product recommendation based on the selection of the first ingested product image and the first ingested product metadata. In some embodiments, the associated product metadata may be based in part on the trained machine learning algorithm analysis determining a make, a model, a year, a VIN, a product price, a mileage, a product location, a shipping fee, a webpage URL, or some combinations thereof from processing the first ingested product image.

In another aspect, a method for dynamically ingesting and monitoring online products is disclosed. The method may include receiving a request to access a webpage, wherein the webpage comprises webpage metadata. The method may include determining whether the webpage includes a predetermined template. The predetermined template may include instructions for locating and ingesting one or more product images and an associated product metadata of the webpage metadata. In response to receiving the predetermined template, the method may further include ingesting the one or more product images and the associated product metadata. In response to finding the webpage does not include a predetermined template, the method may include requesting the webpage for search engine optimization metadata, wherein the webpage metadata includes the search engine optimization metadata. The method may include determining whether the search engine optimization metadata is indicative of at least one product within a first probability threshold. When the search engine optimization metadata is not indicative of at least one product within the first probability threshold, the method may include parsing the metadata of the webpage and determining whether the webpage references the at least one product based on parsed metadata of the webpage. When the search engine optimization metadata is indicative of at least one product within the first probability threshold or when the webpage references the at least one product, the method may include analyzing the webpage, via a trained machine learning algorithm, to determine that one or more images on the webpage correspond to one or more product images and determine that the webpage includes the associated product metadata corresponding to the one or more product images. The method may include ingesting one or more product images and the associated product metadata from the webpage based on the trained machine learning algorithm analysis. The method may include standardizing the ingested one or more product images and the associated product metadata. The method may include configuring for display, in substantially real-time, the ingested one or more product images and the associated product metadata. The ingested one or more product images may be displayed in a standardized format independent of a format of the webpage. Each of the ingested one or more product images may have an associated user input mechanism presented in the standardized format. The method may include receiving a user input based on an interaction with the user input mechanism associated with a first ingested product image and a first ingested product metadata. The method may include saving the first ingested product image and the first ingested product metadata into a product repository. Finally, the method may include dynamically monitoring products stored in the product repository for changes to the first ingested product metadata.

In some embodiments, the one or more product images further include vehicle images and the trained machine learning algorithm is iteratively retrained based on the manual identification of the associated product metadata to recognize the one or more relevant fields on the webpage as indicative of the associated product metadata.

In some embodiments, the associated product metadata may include a make, a model, a year, a VIN, a product price, a mileage, a product location, a shipping fee, a webpage URL, or some combinations thereof. In some embodiments, the predetermined template includes dynamic queries that may be in the form of regular expression, DOM query, or XPath query.

In some embodiments, the method may further include generating an error message indicating that no product images have been identified in response to (i) determining that the one or more images on the webpage do not correspond to one or more product images and (ii) determining that the webpage does not include the associated product metadata. The method may further include generating an error message indicating that no product images corresponding to the associated product metadata have been identified in response to (i) determining that the one or more images on the webpage do not correspond to one or more product images and (ii) determining that the webpage includes the associated product metadata. The method may further include ingesting the one or more product images and the associated product metadata in response to (i) determining that the one or more images on the webpage correspond to one or more product images and (ii) determining that the webpage includes the associated product metadata corresponding to the one or more product images.

In some embodiments, the method may include an indication on the webpage for whether the first ingested product image has already been saved into the product repository. In some embodiments, the method may further include generating a product recommendation based on the selection of the first ingested product image and the first ingested product metadata. In some embodiments, the associated product metadata may be based in part on the trained machine learning algorithm analysis determining a make, a model, a year, a VIN, a product price, a mileage, a product location, a shipping fee, a webpage URL, or some combinations thereof from processing the first ingested product image.

In yet another aspect, a method for dynamically ingesting and monitoring online products is disclosed. The method may include receiving a request to access a webpage. The method may include determining whether the webpage includes a predetermined template. The predetermined template may include instructions for locating and ingesting one or more product images and an associated product metadata from the webpage. In response to receiving the predetermined template, the method may include ingesting the one or more product images and the associated product metadata from the webpage. The method may include standardizing the ingested one or more product images and the associated product metadata. The method may also include configuring for display, in substantially real-time, the ingested one or more product images and the associated product metadata. The ingested one or more product images may be displayed in a standardized format independent of a format of the webpage. The ingested one or more product images may have an associated user input mechanism presented in the standardized format. The method may include receiving a user input based on an interaction with the user input mechanism associated with a first selection of the first ingested product images and a first ingested product metadata. The method may include saving the first ingested product image and the first ingested product metadata into a product repository. Finally, the method may include dynamically monitoring products stored in the product repository for changes to the first ingested product metadata.

In some embodiments, the one or more product images further include vehicle images and the trained machine learning algorithm is iteratively retrained based on the manual identification of the associated product metadata to recognize the one or more relevant fields on the webpage as indicative of the associated product metadata.

In some embodiments, the associated product metadata may include a make, a model, a year, a VIN, a product price, a mileage, a product location, a shipping fee, a webpage URL, or some combinations thereof. In some embodiments, the predetermined template includes dynamic queries that may be in the form of regular expression, DOM query, or XPath query.

In some embodiments, the method may include an indication on the webpage for whether the first ingested product image has already been saved into the product repository. In some embodiments, the method may further include generating a product recommendation based on the selection of the first ingested product image and the first ingested product metadata. In some embodiments, the associated product metadata may be based in part on the trained machine learning algorithm analysis determining a make, a model, a year, a VIN, a product price, a mileage, a product location, a shipping fee, a webpage URL, or some combinations thereof from processing the first ingested product image.

The exemplary systems and methods disclosed herein may provide numerous advantages. Notably, they disclosed systems and methods may aggregate non-standard product data from across multiple webpages, standardize the data format, and provide an aggregated product list in a standard format that is dynamically updated to provide the most up-to-date information to a customer to increase the marketability of the goods, avoid customer confusion about the products being sold, and increase brand and merchant recognition.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

Figure 1B:
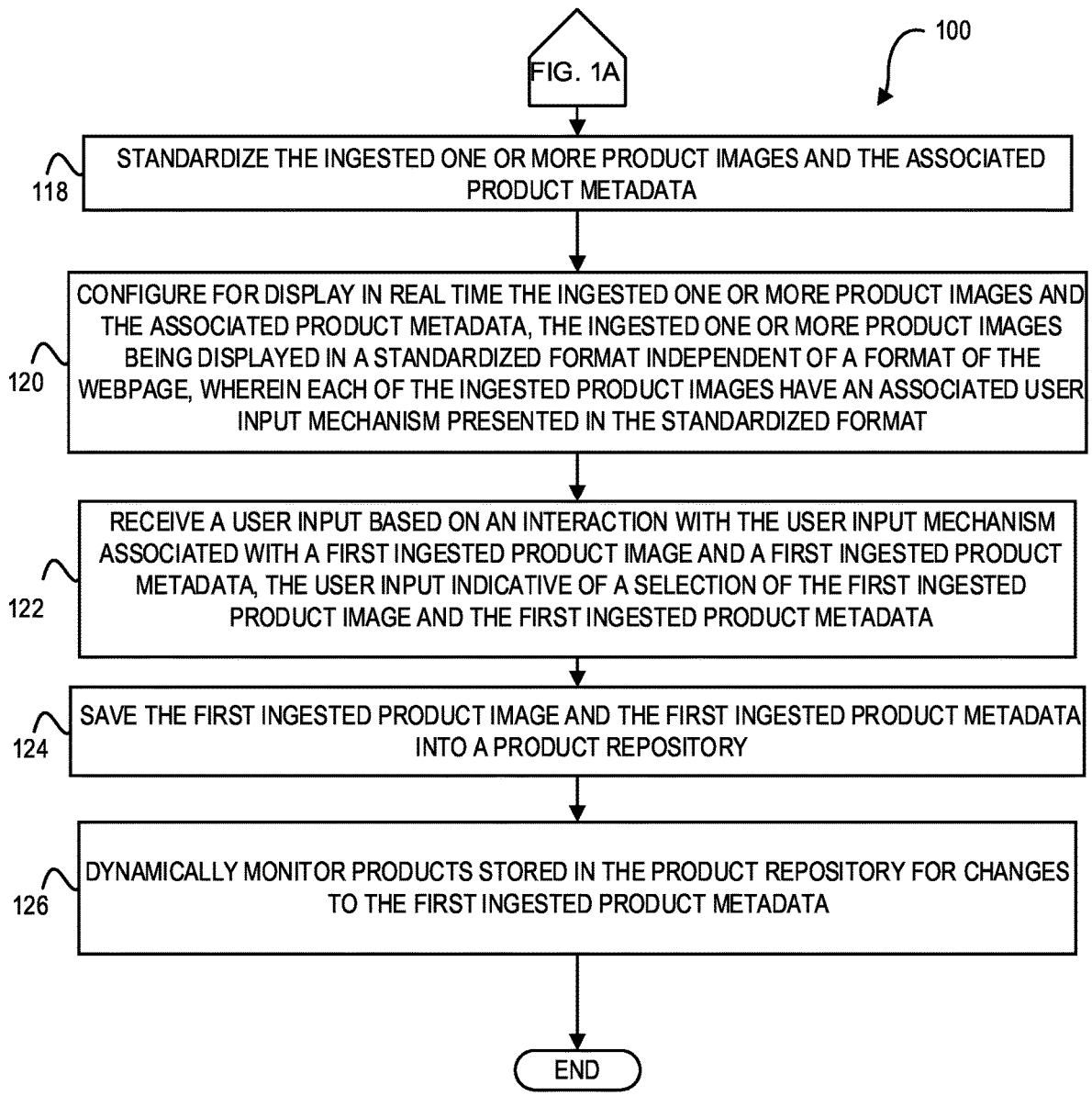

FIGS. 1A-1B are flowcharts of an exemplary method for dynamically ingesting and monitoring online products. As shown in FIG. 1A, in step 102 of method 100, the system (e.g., system 400, described in more detail with respect to FIGS. 4-5) may receive a request to access a webpage. For example, a user may be interested in performing an online search for a vehicle and may click on a resultant webpage and the system may receive the request from a user device (e.g., user device 430, described in more detail with respect to FIGS. 4-5).

In decision block 104, the system may determine whether the webpage includes a predetermined template based on a webpage URL. For example, the system may send a request to an API to determine whether a predetermined template is available for the webpage URL. If a predetermined template is available, it may include instructions for locating and ingesting one or more product images and associated product metadata from the webpage. For example, the predetermined template may include dynamic queries that may be in the form of a regular expression, a DOM query, or an XPath query. The product of interest may be a vehicle. Further, the product metadata may include a vehicle make, a vehicle model, a vehicle model year, a vehicle price, a mileage, a vehicle location, a shipping fee (if the vehicle is not local to the user), and a webpage URL on which the vehicle is advertised. If there is no predetermined template available, the method continues to step 106. If a predetermined template is available for the webpage, then the method continues to step 116, as described below.

In step 106, the system may request the webpage for search engine optimization metadata in response to finding that the webpage does not include a predetermined template. For example, the system may analyze tagged keywords in the search engine optimization data to determine whether any of the keywords are suggestive of a product being listed or offered for sale on the webpage.

In decision block 108, the system may determine whether the search engine optimization metadata is indicative of at least one product being offered for sale on the webpage within a probability threshold. In some embodiments, the probability threshold is minimal, such that any small probability (e.g., 5% or greater) that a product may be listed or offered for sale on the webpage may indicate to the system to perform a secondary search as described in step 110. If the search engine optimization metadata does not indicate that a product is listed or offered for sale on the webpage, the method may further include parsing metadata on the webpage to determine if the webpage includes any products, as described in decision block 109. In some embodiments, determining if the webpage includes any products may include identifying keywords for an associated product within the parsed webpage and scoring the webpage based on the relevance of the identified keywords. If any indication of a product offered for sale is determined based on the search engine optimization metadata, the method moves to step 110. Optionally, in some embodiments, if the search engine optimization metadata indicates at least one product within the first probability threshold, the method may include determining if the page references a product based on parsed metadata as discussed in block 109 before moving to step 110. Optionally, in other embodiments, the method may skip decision block 108 and move directly from step 106 to decision block 109.

Figure 4:
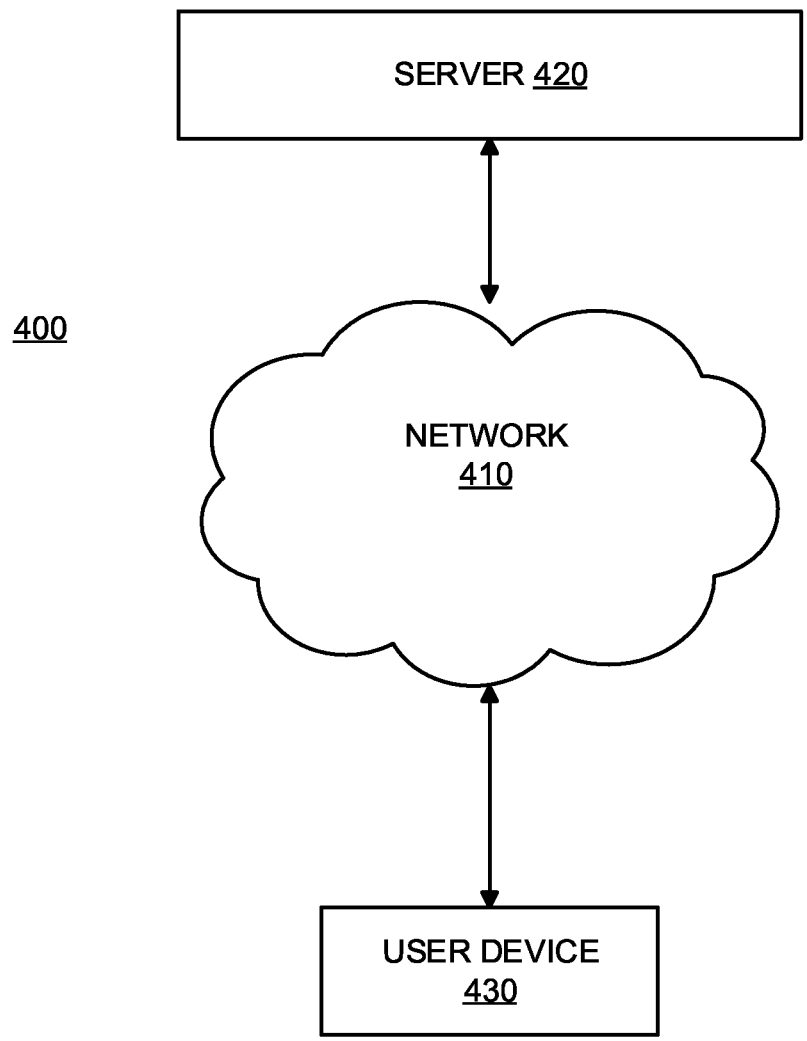
FIG. 4 is a diagram of a system for conducting online product comparison according to an exemplary implementation of the disclosed technology.
Figure 5:
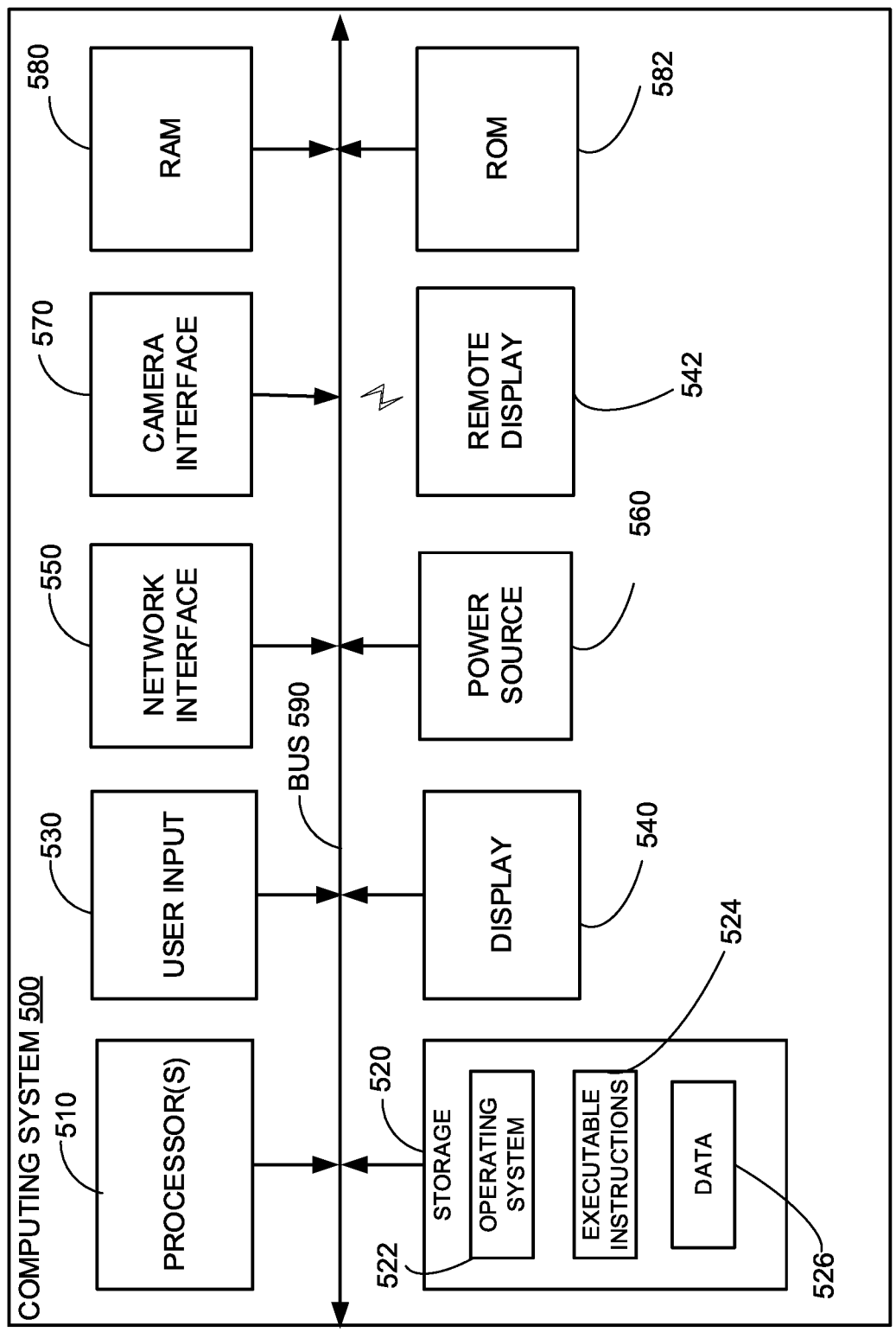
FIG. 5 depicts a computing system architecture according to an exemplary implementation of the disclosed technology.

In decision block 109, the system may determine if the webpage references a product based on parsing the webpage metadata by the system (e.g., via server 420, described in more detail with respect to FIGS. 4-5). For example, if the system determines that the webpage includes webpage metadata that indicates a listed product on the webpage, the method may move to step 110. If the system determines that the webpage does not include webpage metadata that indicates a listed product on the webpage the method may end.

In some embodiments, the method may further include generating an error message indicating that no product images have been identified in response to (i) determining that the one or more images on the webpage do not correspond to one or more product images and (ii) determining that the webpage does not include the associated product metadata. The method may further include generating an error message indicating that no product images corresponding to the associated product metadata have been identified in response to (i) determining that the one or more images on the webpage do not correspond to one or more product images and (ii) determining that the webpage includes the associated product metadata. The method may further include ingesting the one or more product images and the associated product metadata in response to (i) determining that the one or more images on the webpage correspond to one or more product images and (ii) determining that the webpage includes the associated product metadata corresponding to the one or more product images. For example, the system (e.g. user device 430 and/or server 420 of system 400, described in more detail with respect to FIGS. 4-5) may generate the error message for display on the user device. When the error message is generated by the server, the system may transmit the error message to the user device for display. When the user device generates the error message, it is displayed by the user device (e.g., via the display 540, as described in more detail with respect to FIG. 5).

In step 110, the system may analyze the webpage via a trained machine learning algorithm. The algorithm may be trained to determine whether one or more images on the webpage correspond to one or more product images. In some embodiments, the product images may be vehicle images. In some embodiments, the machine learning algorithm may ignore product images in which the product is not the main subject of the image. For example, when the product is a vehicle, the machine learning algorithm may ignore a vehicle image in which the vehicle is not the focus of the image, but merely appears in the background.

In step 111, the system may use the trained machine learning algorithm to scan text in proximity to the one or more product images to perform text classification in order to determine whether the text includes metadata directly associated with the one or more product images. For example, when the one or more products include vehicles, the trained machine learning algorithm may be used to identify the make, model, year, color, trim, etc., of a specific vehicle based on the vehicle image. In some embodiments, the trained machine learning algorithm may identify associated product metadata by scanning webpage text that appears proximate to the vehicle image. In some embodiments, text classification of step 111 is performed by one of a plurality of supervised learning algorithms implemented on the system. For example, the system may perform text classification using support vector machine modeling, linear classification, naïve bayes classification, gradient boosting classification methods, shallow neural network classification, deep neural network classification, convolutional neural network classification, recurrent neural network classification, recurrent convolutional neural network classification, or combinations thereof.

After the machine learning algorithm identifies one or more images and/or associated metadata on the webpage as one or more product images and their associated metadata, the method moves to decision block 112. In decision block 112, the system determines whether metadata associated with the one or more product images is missing. For example, the trained machine learning algorithm may identify a vehicle image as one of the one or more product images, but an analysis of the webpage may reveal that vehicle information such as mileage, a price, a VIN, etc., is either missing or incomplete. If the system determines that there is missing metadata associated with the one or more product images, the method moves from decision block 112 to step 114. However, if the system determines that there is no missing metadata associated with the one or more product images, the method moves from decision block 112 to step 116, described below.

In step 114, the system may prompt the user to manually identify one or more relevant fields on the webpage corresponding to the associated product metadata. For example, the user may be prompted to enter product metadata, such as a price or location of the product. Additionally, the manual feedback given by the user may be used to reinforce the trained machine learning algorithm in order to increase the efficiency and accuracy with which the trained machine learning algorithm may identify metadata associated to the identified one or more product images. For example, manual user identification may improve the availability and accuracy of the predetermined templates. Further, prompts in the one or more relevant fields on the webpage may be prefilled with text from the parsed metadata as an approximation or best guess. The user may keep some or even all of the prefilled text during the manual identification step. In some embodiments, an existing predetermined template from a different source webpage may be applied to the current webpage in an attempt to parse the webpage's data.

In step 116, the system may ingest the one or more product images and the associated product metadata from the webpage. For example, the system may receive the product images and their associated product metadata at an API installed on a user device (as described in more detail with respect to FIGS. 4-5), the API being configured to communicate with a system server which receives the one or more product images and their associated product metadata. In some embodiments, all the steps of method 100 may happen in substantially real-time (e.g., on the order of a few seconds) except for the manual identification step described with respect to step 114. In some embodiments, the ingested product images and metadata may be displayed in a standardized format regardless of the format on the webpage from which the product images and the associated product metadata were collected. Accordingly, a user may conveniently monitor all products offered on a particular webpage.

Following data ingestion, the method moves to step 118, as shown in FIG. 1B. In step 118, the ingested one or more product images and their associated product metadata may be standardized. For example, the system may be capable of identifying the images and metadata that should be ingested, and may standardize the format and organizational structure of the product images and the associated product metadata to improve readability and ease of use after ingestion of the products into the system for display and dynamic monitoring of the selected products. For example, when the product in question is a vehicle, the identified vehicle images may be displayed next to data extracted from the product metadata. A user may be more concerned with vehicle price and vehicle location than he or she is with the mileage of the vehicle. Accordingly, the system may standardize the formatting of the information to display most relevant associated product metadata more prominently to increase case of use for the user.

In step 120, the system may configure for display, in substantially real time (e.g., within a few seconds), the ingested one or more product images and their associated product metadata. The ingested one or more product images may be displayed in a standardized format independent of a format of the webpage. Additionally, each of the ingested product images may have an associated user input mechanism presented in the standardized format. For example, in the case of a user wanting to compare multiple vehicles on a webpage, the system will ingest all the identified vehicle images, and display to the user, via an API (discussed in more detail with respect to FIGS. 4-5 and the exemplary use section), the vehicle images in a standardized format. Within the presentation to the user, each of the vehicle images may include a user input mechanism, allowing the user to select (e.g., via an input/output on a user device 430, discussed in more detail in FIGS. 4-5) the vehicle images that are of interest to the user.

In step 122, the system may receive a user input based on an interaction with the user input mechanism associated with a first ingested product image and its associated product metadata. For example, a first ingested product image may include a product that appears on a webpage that has been selected by a user for dynamically ingesting and monitoring by the system (e.g., system 400). The user input may be indicative of a selection of the first ingested product image and a first ingested product metadata. For example, returning back to the vehicle example, the user may select, via the input mechanism, Vehicle A, which may indicate that the user is interested in monitoring Vehicle A and its associated vehicle data (i.e., associated product metadata) for any changes that may occur over time. For example, the user may be interested in knowing that the reported vehicle mileage has increased from 120,000 miles to 135,000 miles, or the user may be interested in knowing that the vehicle location changed from Los Angeles to Sacramento because the vehicle was shipped from one dealership location to another.

In step 124, the system may save the first ingested product image and its associated product metadata into a product repository. The product repository may be stored on server 420 and/or user device 430 (discussed below in reference to FIGS. 4-5) for the user's convenient access. In some embodiments, the products stored in the product repository may be accessible even after the user has closed his or her browser session. The advantages of storing the product repository on the user device 430 rather than on server 420 may include increasing the systems efficiency by lowering the computational processing power and network bandwidth required to perform the steps of method 100. The advantages of storing the product repository on the server 420 may include the added capability of the user to save and review the ingested product images and metadata across multiple user devices.

In step 126, the system may dynamically monitor products stored in the product repository for changes to product metadata. As discussed above with respect to the vehicle example, the user may want to know whether details associated a vehicle he/she selected (i.e., the first ingested product image) have changed. For example, the user may be interested in knowing that the reported vehicle mileage has increased from 120,000 miles to 135,000 miles, or the user may be interested in knowing that the vehicle location changed from Los Angeles to Sacramento because the vehicle was shipped from one dealership location to another. Additionally, in some embodiments, the system may be configured to generate a product recommendation based on the selection of the first ingested product image and its associated product metadata. For example, if another vehicle had already been saved to a repository from either the same webpage or another source, the system may determine that a recommended vehicle based on the selected vehicle's associated product metadata. A user that has previously selected an SUV with 60,000 miles may be recommended a similar SUV with 60,000 miles, but perhaps with a lower price or location closer to the user.

Figure 2A:
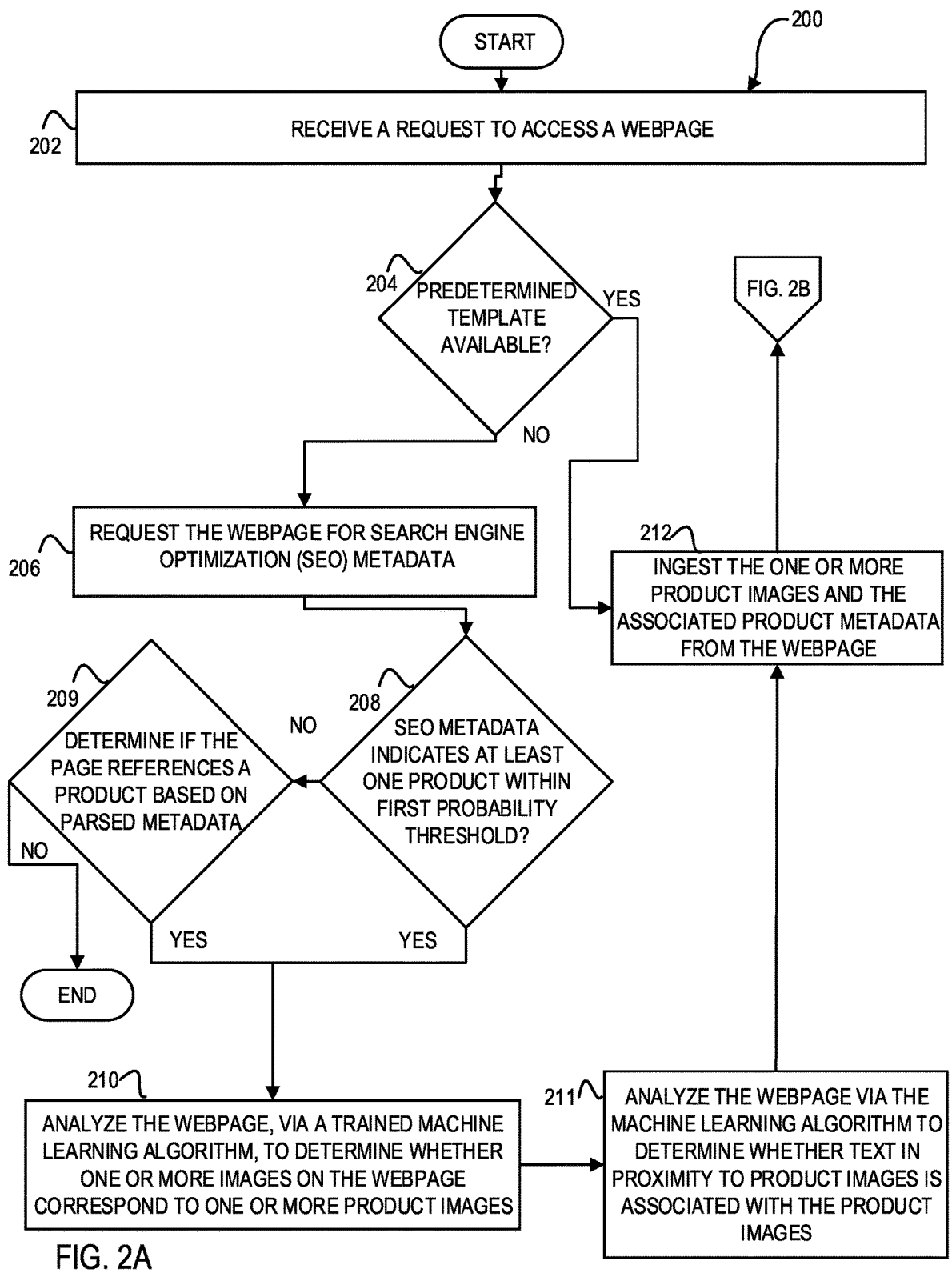
FIG. 2A-2B is a flowchart of another exemplary method for dynamically ingesting and monitoring online products.
Figure 2B:
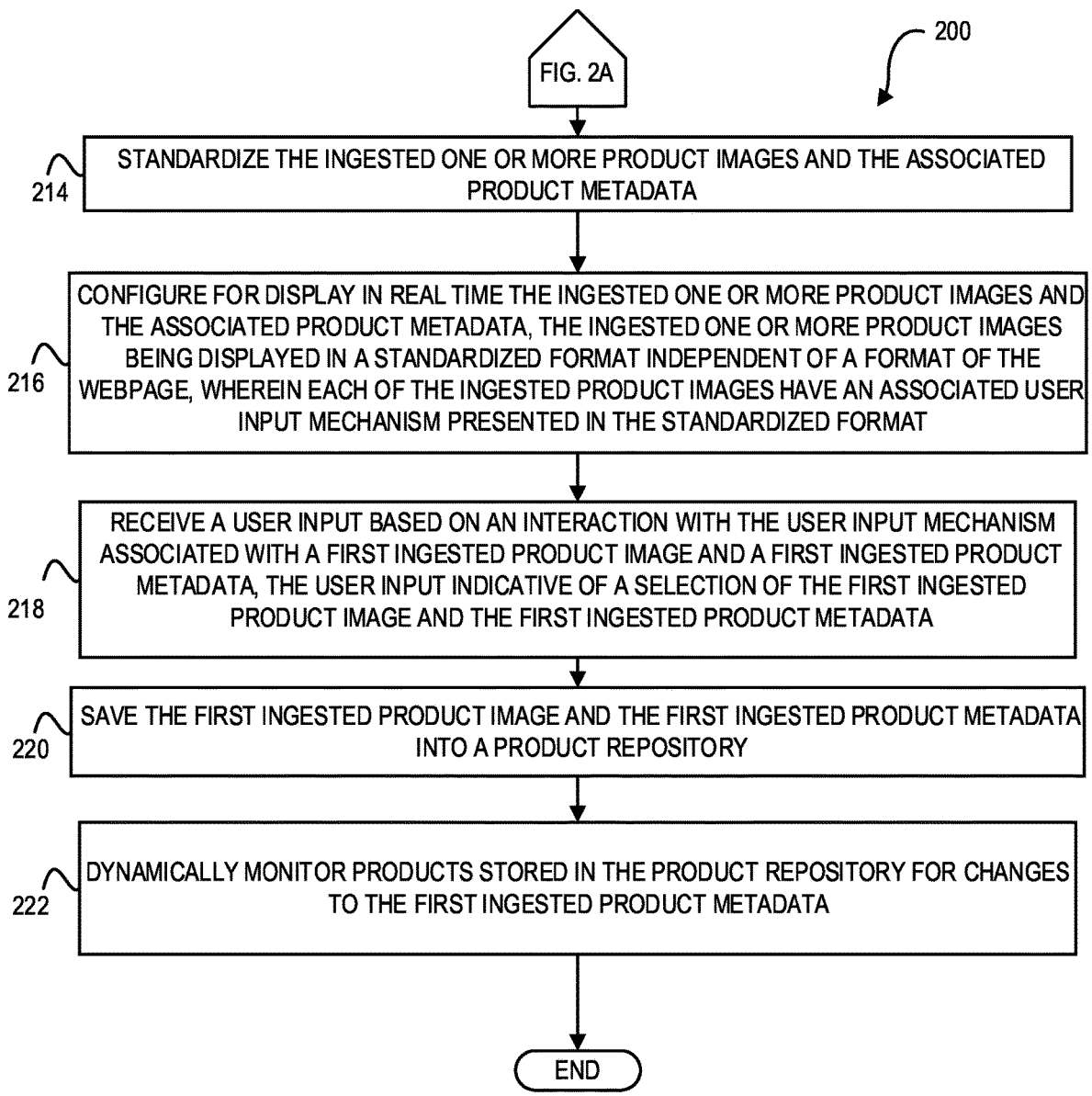

FIGS. 2A-2B are flowcharts of another exemplary method for dynamically ingesting and monitoring online products. As shown in FIG. 2A, in step 202 of method 200, the system (e.g., system 400, described in more detail with respect to FIGS. 4-5) may receive a request to access a webpage. For example, a user may be interested in performing an online search for a vehicle and may click on a resultant webpage and the system may receive the request from a user device (e.g., user device 430, described in more detail with respect to FIGS. 4-5).

In decision block 204, the system may determine whether the webpage includes a predetermined template based on a webpage URL. For example, the system may send a request to an API to determine whether a predetermined template is available for the webpage URL. If a predetermined template is available, it may include instructions for locating and ingesting one or more product images and associated product metadata from the webpage. For example, the predetermined template may include dynamic queries that may be in the form of a regular expression, a DOM query, or an XPath query. The product of interest may be a vehicle. Further, the product metadata may include a vehicle make, a vehicle model, a vehicle model year, a vehicle price, a mileage, a vehicle location, a shipping fee (if the vehicle is not local to the user), and a webpage URL on which the vehicle is advertised. If there is no predetermined template available, the method continues to step 206. If a predetermined template is available for the webpage, then the method continues to step 212, as described below.

In step 206, the system may request the webpage for search engine optimization metadata in response to finding that the webpage does not include a predetermined template. For example, the system may analyze tagged keywords in the search engine optimization data to determine whether any of the keywords are suggestive of a product being listed or offered for sale on the webpage.

In decision block 208, the system may determine whether the search engine optimization metadata is indicative of at least one product being offered for sale on the webpage within a probability threshold. In some embodiments, the probability threshold is minimal, such that any small probability (e.g., 5% or greater) that a product may be listed or offered for sale on the webpage may indicate to the system to perform a secondary search as described in step 210. If the search engine optimization metadata does not indicate that a product is listed or offered for sale on the webpage, the method may further include parsing metadata on the webpage to determine if the webpage includes any products, as described in decision block 209. If any indication of a product offered for sale is determined based on the search engine optimization metadata, the method moves to step 210. Optionally, in some embodiments, if the search engine optimization metadata indicates at least one product within the first probability threshold, the method may include determining if the page references a product based on parsed metadata as discussed in block 209 before moving to step 210. Optionally, in other embodiments, the method may skip decision block 208 and move directly from step 206 to decision block 209.

In decision block 209, the system may determine if the webpage references a product based on parsing the webpage metadata by the system (e.g., via server 420, described in more detail with respect to FIGS. 4-5). For example, if the system determines that the webpage includes webpage metadata that indicates a listed product on the webpage, the method may move to step 210. If the system determines that the webpage does not include webpage metadata that indicates a listed product on the webpage the method may end.

In some embodiments, the method may further include generating an error message indicating that no product images have been identified in response to (i) determining that the one or more images on the webpage do not correspond to one or more product images and (ii) determining that the webpage does not include the associated product metadata. The method may further include generating an error message indicating that no product images corresponding to the associated product metadata have been identified in response to (i) determining that the one or more images on the webpage do not correspond to one or more product images and (ii) determining that the webpage includes the associated product metadata. The method may further include ingesting the one or more product images and the associated product metadata in response to (i) determining that the one or more images on the webpage correspond to one or more product images and (ii) determining that the webpage includes the associated product metadata corresponding to the one or more product images. For example, the system (e.g. user device 430 and/or server 420 of system 400, described in more detail with respect to FIGS. 4-5) may generate the error message for display on the user device. When the error message is generated by the server, the system may transmit the error message to the user device for display. When the user device generates the error message, it is displayed by the user device (e.g., via the display 540, as described in more detail with respect to FIG. 5).

In step 210, the system may analyze the webpage via a trained machine learning algorithm. The algorithm may be trained to determine whether one or more images on the webpage correspond to one or more product images. In some embodiments, the product images may be vehicle images. In some embodiments, the machine learning algorithm may ignore product images in which the product is not the main image subject of the image. For example, when the product is a vehicle, the machine learning algorithm may ignore a vehicle image in which the vehicle is not the focus of the image, but merely appears in the background.

In step 211, the system may use the trained machine learning algorithm to scan text in proximity to the one or more product images to determine whether the text includes metadata directly associated with the one or more product images. For example, when the one or more products include vehicles, the trained machine learning algorithm may be used to help identify the make, model, year, color, trim, etc., of a specific vehicle image.

In step 212, the system may ingest the one or more product images and the associated product metadata from the webpage. For example, the system may receive the product images and their associated product metadata at an API installed on a user device (as described in more detail with respect to FIGS. 4-5), the API being configured to communicate with a system server which receives the one or more product images and their associated product metadata. In some embodiments, all the steps of method 100 may happen in substantially real-time (e.g., on the order of a few seconds). In some embodiments, the ingested product images and metadata may be displayed in a standardized format regardless of the format on the webpage from which the product images and the associated product metadata were collected. Accordingly, a user may conveniently monitor all products offered on a particular webpage.

Following data ingestion, the method moves to step 214, as shown in FIG. 2B. The steps described in FIG. 2B are substantially identical to those described earlier in reference to FIG. 1B. Accordingly, an in-depth explanation of steps 214-222 is omitted here.

Figure 3A:
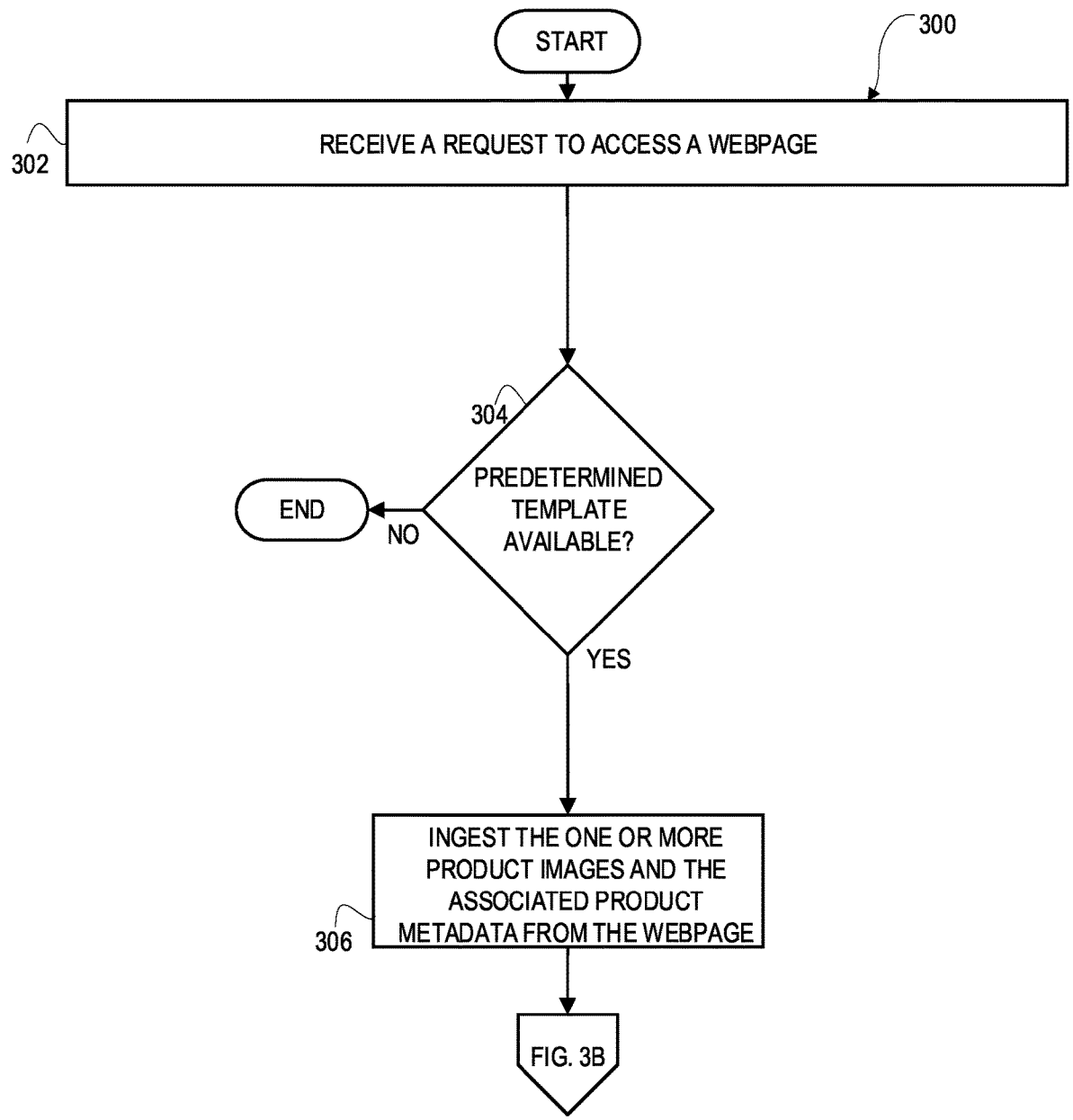
FIGS. 3A-3B are flowcharts for a further exemplary method for dynamically ingesting and monitoring online products.
Figure 3B:
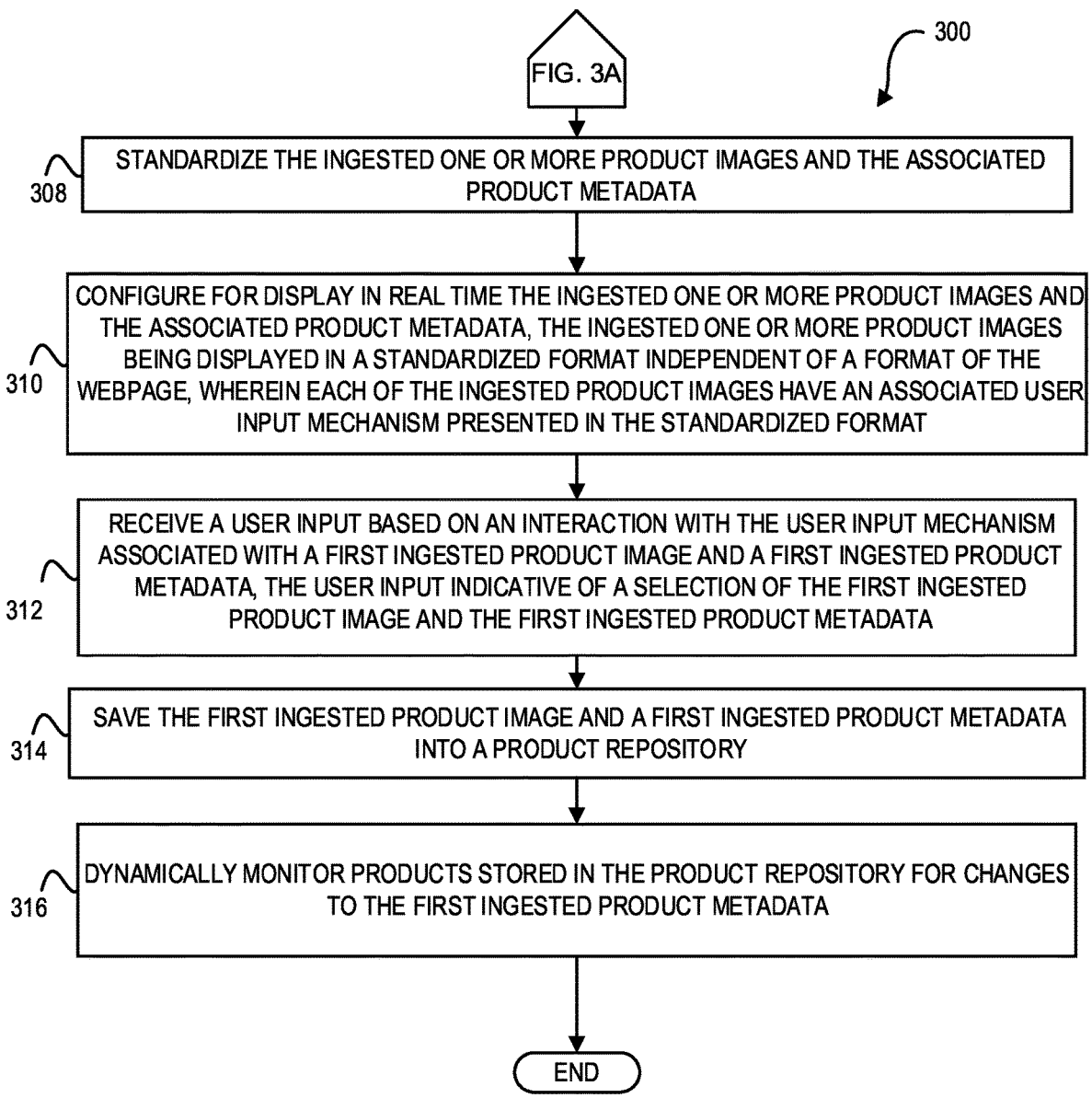

FIGS. 3A-3B are flowcharts of yet another exemplary method for dynamically ingesting and monitoring online products. As shown in FIG. 3A, in step 302 of method 300, the system (e.g., system 400, described in more detail with respect to FIGS. 4-5) may receive a request to access a webpage. For example, a user may be interested in performing an online search for a vehicle and may click on a resultant webpage and the system may receive the request from a user device (e.g., user device 430, described in more detail with respect to FIGS. 4-5).

In decision block 304, the system may determine whether the webpage includes a predetermined template. The predetermined template may include instructions for locating and ingesting one or more product images and associated product metadata from the webpage. For example, the predetermined template may include dynamic queries that may be in the form of a regular expression, a DOM query, or an XPath query. The product of interest may be a vehicle. Further, the product metadata may include a vehicle make, a vehicle model, a vehicle model year, a vehicle price, a mileage, a vehicle location, a shipping fee (if the vehicle is not local to the user), and a webpage URL on which the vehicle is advertised. If there is no predetermined template available, the method ends. If a predetermined template is available for the webpage, then the method continues to step 306, as described below.

In step 306, the system may ingest the one or more product images and the associated product metadata from the webpage. For example, the system may receive the product images and their associated product metadata at an API installed on a user device (as described in more detail with respect to FIGS. 4-5), the API being configured to communicate with a system server which receives the one or more product images and their associated product metadata. In some embodiments, all the steps of method 300 may happen in substantially real-time (e.g., on the order of a few seconds). In some embodiments, the ingested product images and metadata may be displayed in a standardized format regardless of the format on the webpage from which the product images and the associated product metadata were collected. Accordingly, a user may conveniently monitor all products offered on a particular webpage.

Following data ingestion, the method moves to step 308, as shown in FIG. 3B. The steps described in FIG. 3B are substantially identical to those described earlier in reference to FIG. 1B and FIG. 2B. Accordingly, an in-depth explanation of steps 308-316 is omitted here.

FIG. 4 is a diagram of a dynamic ingestion and monitoring system, according to an exemplary implementation of the disclosed technology. The components and arrangements shown in FIG. 4 are not intended to limit the disclosed invention as the components used to implement the disclosed processes and features may vary. In accordance with the disclosed embodiments, an online product comparison system 400 may include a server 420 which may serve as the central processor enabling the methods disclosed herein. Server 420 may be in communication with a user device 430 via network 410. In some embodiments, user device 430 may perform some or all of the processing steps of the server 420. Numerous advantages are present when user device 430 stores the product repository. For example, storing the product repository on a local user device may save valuable computational power and improve the speed and functionality of system 400. Alternatively, storing the product repository on server 420 also may bring its own advantages. For example, when the product repository is stored on the server 420 of system 400, the system 400 may more quickly and efficiently dynamically update the metadata associated with the first ingested product, allowing a user to more quickly see changes associated with a product (e.g. vehicle) of interest.

Server 420 and user device 430 may each include one or more mobile computing devices (e.g., tablet computers or portable laptop computers) or stationary computing devices (e.g., stationary desktops), and have components and functionalities as described in more detail with respect to FIG. 5.

Network 410 may be of any suitable type, including individual connections via the internet such as cellular or WiFi networks. In some embodiments, network 410 may connect terminals using direct connections such as radio-frequency identification (RFID), near-field communication (NFC), Bluetooth®, low energy Bluetooth® (BLE), WiFi™, ZigBee®, ambient backscatter communications (ABC) protocols, USB, or LAN.

In some embodiments, one or more of dynamic ingestion and monitoring methods disclosed herein may be performed in part or entirely by one or more of user device 430 and server 420. For example, in some embodiments, user device 430 may execute the trained machine learning algorithm for identification of one or more images on the webpage that correspond to one or more product images. Similarly, in other embodiments, server 420 may execute the trained machine learning algorithm for identification of one or more images on the webpage that correspond to one or more product images. Both user device 430 and server 420 may comprise more or fewer of the components disclosed in FIG. 5, enabling both the user device 430 and the server 420 to perform the steps of dynamically ingesting and monitoring online products.

A computing device architecture 500 is illustrated in FIG. 5, and implementations of the disclosed technology may include a computing device with more or fewer components than those shown. It will be understood that computing device architecture 500 is provided for example purposes only and does not limit the scope of the various implementations of the present disclosed systems, methods, and computer-readable mediums.

As shown, computing device architecture 500 may include a central processing unit (CPU) 510, where computer instructions may be processed; a display interface 540 that supports a graphical user interface and provides functions for rendering video, graphics, images, and texts on the display. In certain example implementations of the disclosed technology, display interface 540 may connect directly to a local display, such as a desktop monitor. In another example implementation, display interface 542 may be configured for providing data, images, and other information for an external/remote display that is not necessarily physically connected to the computing device 500 (e.g., when server 420 performs substantially all steps of one of methods 100, 200, or 300, and user device 430 acts as remote display 542). For example, a desktop monitor or a user's mobile device (e.g. user device 430) may be utilized for mirroring graphics and other information that is requested from remote server. In certain example implementations, display interface 542 wirelessly communicates, for example, via a Wi-Fi channel, Bluetooth connection, or other available network connection interface 550 to the external/remote display.

In an example implementation, network connection interface 550 may be configured as a wired or wireless communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, another like communication interface, or any combination thereof.

Computing device architecture 500 may include a user input 530 that provides a communication interface to a physical or virtual keyboard. Computing device architecture 500 may be configured to use one or more input components via one or more of input/output interfaces (for example, keyboard interface 530, display interface 540, network connection interface 550, a camera interface 570, etc.) to allow computing device architecture 500 to present information to a user and capture information from a device's environment including instructions from the device's user. The input components may include a mouse, a trackball, a directional pad, a track pad, a touch-verified track pad, a pressure-sensitive track pad, a pressure-sensitive display, a scroll wheel, a digital camera, a digital video camera, a web camera, and the like. Additionally, an input component may be integrated with the computing device architecture 500 or may be a separate device.

In example implementations, network connection interface 550 may support a wireless communication interface to a network (e.g., network 410). As mentioned above, display interface 540 may be in communication with network connection interface 550, for example, to provide information for display on a remote display 542 that is not directly connected or attached to the system. In certain implementations, camera interface 570 may be provided that acts as a communication interface and provides functions for capturing digital images from a camera. According to example implementations, a random-access memory (RAM) 580 may be provided, where computer instructions and data may be stored in a volatile memory device for processing by the processor(s) 510.

According to example implementations, computing device architecture 500 may include a read-only memory (ROM) 582 where invariant low-level system code or data for basic system functions such as basic input and output (I/O), startup, or reception of keystrokes from a keyboard may be stored in a non-volatile memory device. According to example implementations, computing device architecture 500 may include a storage medium 520 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), for storing files including an operating system 522, application programs (including, for example, a web browser application, a widget or gadget engine, and or other applications, as necessary), executable instructions 524 (including stored programs that enable various operations of the method such as an API which may, for example, allow user device 430 to communicate with one or more servers 430 that perform the steps of one of methods 100, 200, or 300), and data files 526, which may include images and metadata corresponding to a product type. According to example implementations, computing device architecture 500 may include a power source 560 that may provide an appropriate alternating current (AC) or direct current (DC) to power components.

According to an example implementation, processor 510 may have appropriate structure to be a computer processor. In one arrangement, processor 510 may include more than one processing unit. RAM 580 may interface with a computer bus 590 to provide quick RAM storage to the processor 510 during the execution of software programs such as the operating system, application programs, and device drivers. More specifically, processor 510 may load computer-executable process steps from storage medium 520 or other media into a field of RAM 580 to execute software programs. Data may be stored in RAM 580, where computer processor 510 may access data during execution. In one example configuration, and as will be understood by one of skill in the art, computing device architecture 500 may include sufficient RAM and flash memory for carrying out processes relating to the disclosed technology.

Storage medium 520 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media may allow a computing device to access computer-executable process steps, application programs and the like, stored on removable and non-removable memory media, to offload data from the device or to upload data onto the device. A computer program product, such as one utilizing an image cropping system, may be tangibly embodied in storage medium 520, which may include a non-transitory, machine-readable storage medium.

According to example implementations, the term "computing device," as used herein, may be a processor, or conceptualized as a processor (for example, processor 510 of FIG. 2). In such example implementations, the computing device (processor) may be coupled, connected, and/or in communication with one or more peripheral devices, such as display 540 and/or external display 542.

In example implementations of the disclosed technology, a computing device includes any number of hardware and/or software applications that are executed to facilitate any of the operations. In example implementations, one or more user input interfaces 530 may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, etc., may facilitate user interaction with the computing device. The one or more user input interfaces 530 may be utilized to receive or collect data and/or user instructions from a wide variety of input devices. Received data may be processed by one or more computer processors 510 as desired in various implementations of the disclosed technology and/or stored in one or more memory devices, such as storage medium 520.

One or more network interfaces 550 may facilitate connection of the computing device inputs and outputs to one or more suitable networks and/or connections. For example, the connections that facilitate communication with any number of sensors associated with the system. The one or more network interfaces 550 may further facilitate connection to one or more suitable networks; for example, a local area network, a wide area network, the Internet, a Wi-Fi enabled network, a satellite-based network, any wired network, any wireless network, etc., for communication with external devices and/or systems.

Figure 6A:
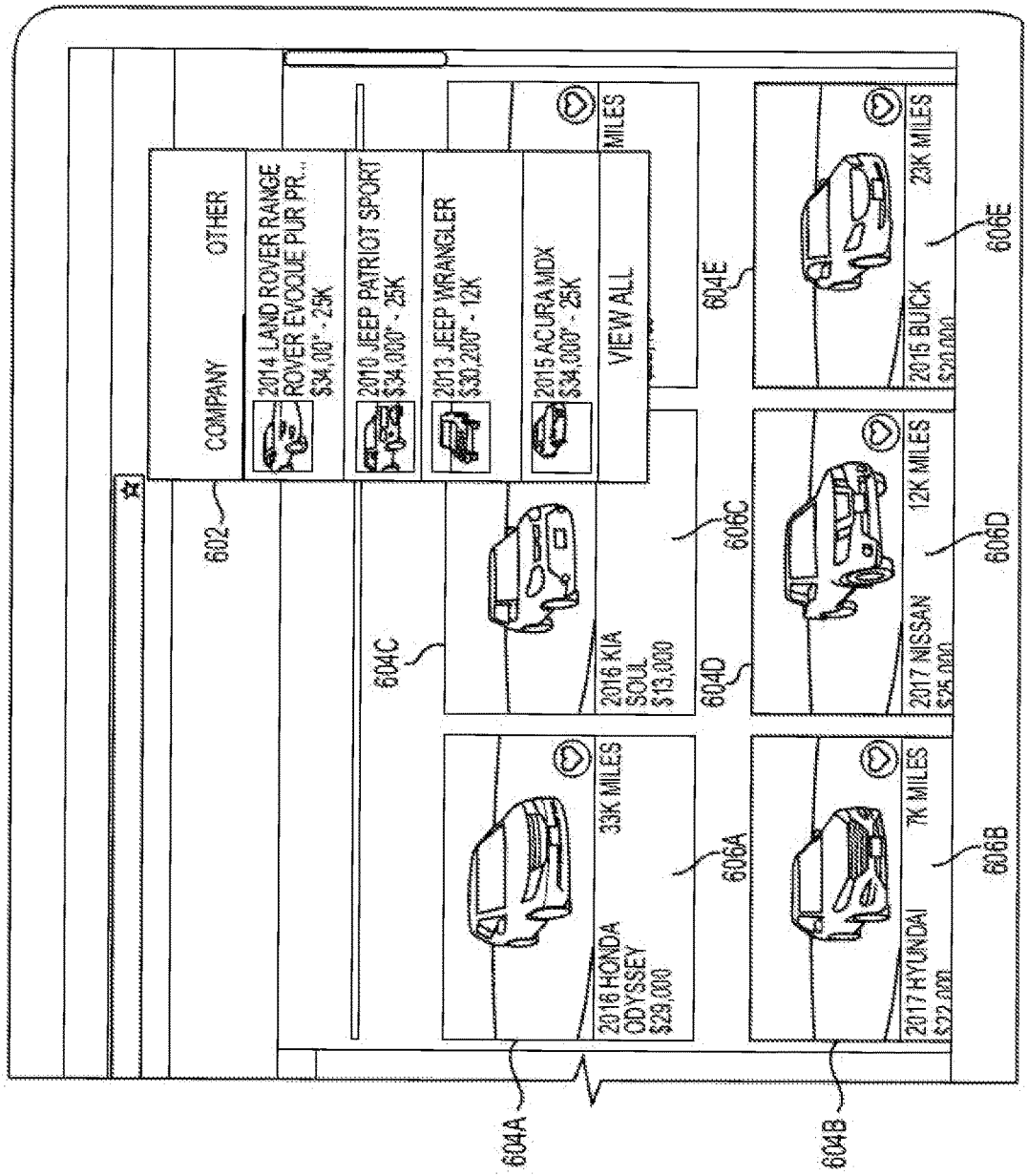
Figure 6B:
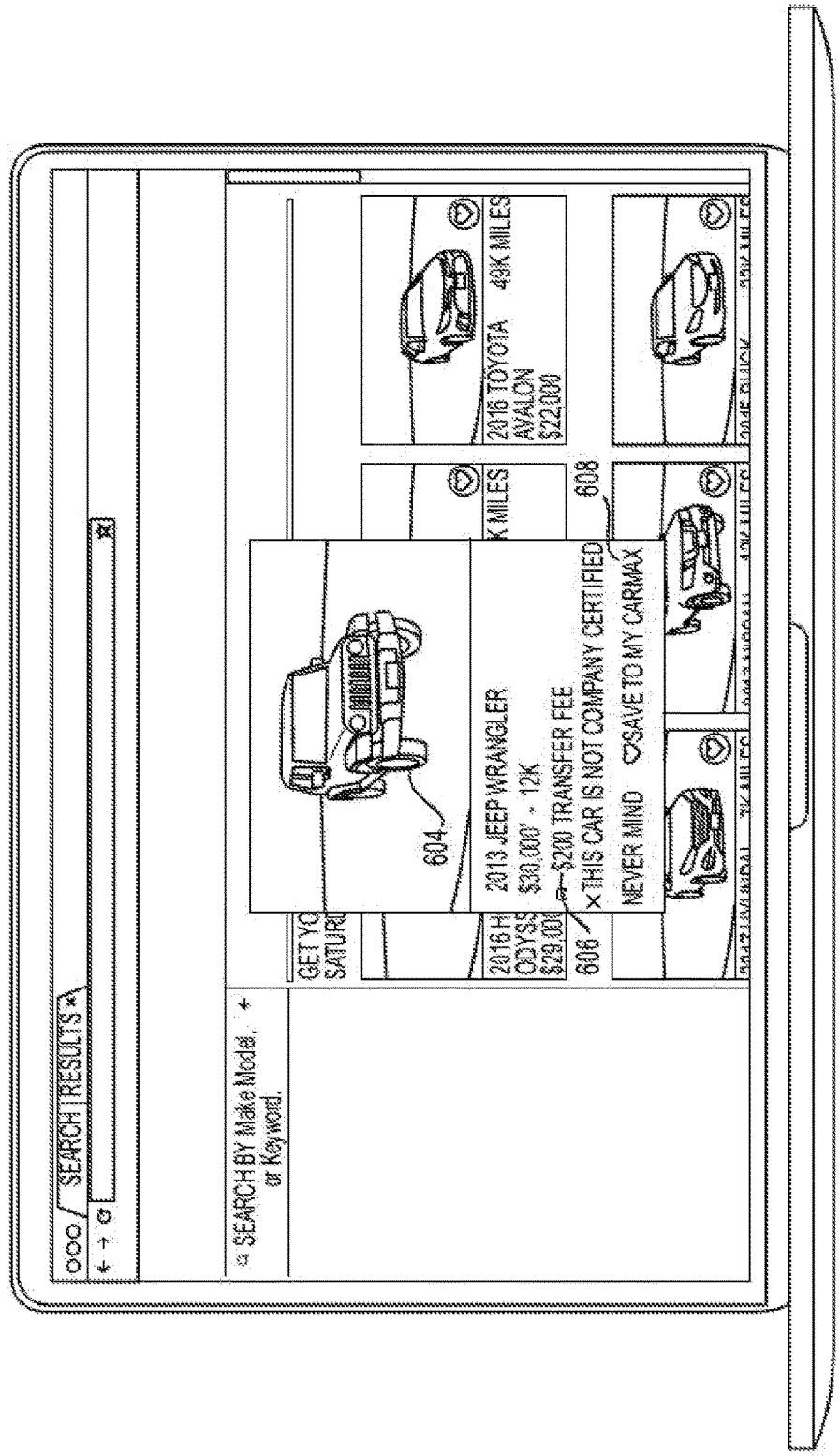
Figure 6C:
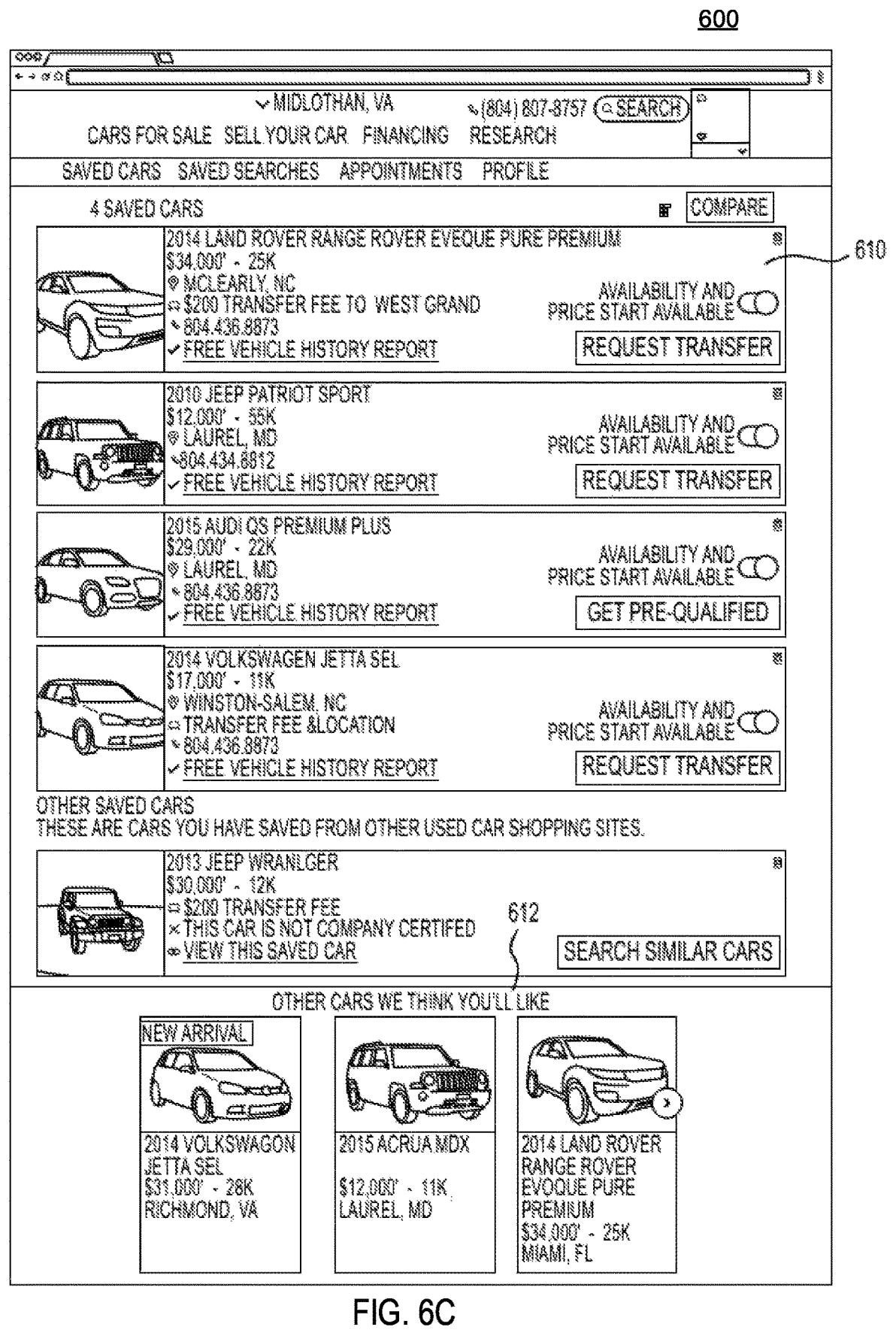

FIGS. 6A-6C depict an API for dynamically ingesting and monitoring online products, according to an exemplary embodiment. For example, FIG. 6A depicts an example implementation of the method for dynamically ingesting and monitoring online products, according to an exemplary embodiment. The API 602 may ingest one or more product images 604 (labeled individually as 604A, 604B, . . . 604E, etc.) and the associated product metadata 606 (labeled individually as 606A, 606B, . . . 606E, etc.) from the webpage 600.

FIG. 6B depicts an exemplary embodiment of the process by which the API may configure for display the ingested one or more product images 604 in a standardized format that includes an associated user input mechanism 608. Responsive to receiving a user input indicative of a selection of the ingested one or more product images, the system (e.g., system 400) may save the selected ingested product image 604 and a first ingested product metadata 606 into a product repository. The product repository may be stored on server 420 and/or user device 430 for the user's convenient access. In some embodiments, the products stored in the product repository may be accessible even after the user has closed his or her browser session. The advantages of storing the product repository on the user device 430 rather than on server 420 may include increasing the systems efficiency by lowering the computational processing power and network bandwidth required to perform the steps of method 100. The advantages of storing the product repository on the server 420 may include decreasing latency with which the system may dynamically monitor and update product metadata associated with the ingested product image(s). Additional advantages include the added capability of the user to save and review the ingested product images and metadata across multiple user devices.

FIG. 6C depicts an exemplary embodiment of a visual representation of the product repository 610. In some embodiments, the system may make a recommendation of one or more products 612 based on the metadata associated with one or more saved product images.

Exemplary Use

Example implementations of the disclosed technology can provide systems and methods for conducting online product comparison by aggregating nonstandard data comprising image and metadata associated with online products into a standardized format for storage in a centralized database. The following example implementations are intended solely for explanatory purposes and are intended to be non-limiting. The describe example implementations utilize a server and/or user device (e.g., server 420, user device 430) to ingest one or more product images and their associated product metadata. In some example implementations, the system (e.g., system 400) provides an interface for searching the inventory of motor vehicles from a source webpage (e.g., via API loaded into user device 430 as executable instructions 524).

In some example implementations, the system 400 may save one or more products to a product repository (which may be stored locally by user device 430 or on server 420 of system 400), wherein the one or products may represent cars and trucks for sale, each car and truck having searchable features or attributes (e.g., associated product metadata). The system may start by receiving a request to access a webpage from a user of system 400 (e.g., remotely via the API loaded as executable instructions 524 on user device 430). The system may query the URL of the webpage to determine whether the webpage contains a predetermined template for looking up the data structure of the webpage. For example, the predetermined template may contain instructions for locating and ingesting one or more product images and the associated product metadata from the webpage.

In some example implementations, the webpage may not have a predetermined template associated with its URL. In this case, the system may request search engine optimization data (e.g., by the processor 510 via network interface 550 as implemented in server 420). The search engine optimization data may include keywords associated with the source webpage. If the source webpage includes keywords that are indicative of a product of interest for sale on the source webpage, a secondary analysis may be performed of the webpage. The secondary analysis may include determining if the webpage references a product based on parsed metadata prior to initializing a trained machine learning algorithm to determine whether any of the images located on the source webpage include a product of interest (e.g. a vehicle for sale) as the main subject of the photo. If, for example, there is a photo that includes a vehicle, but the vehicle is not the main subject of the photo (e.g., a vehicle located in the background of a photo), then the algorithm will not identify such a photo as containing a product of interest. In some example implementations, the trained machine learning algorithm may be able to match associated product metadata to the identified photos containing a product of interest (e.g., vehicle of interest to the user).

In some example implementations, the trained machine learning algorithm may determine that one or more images on the webpage correspond to product images and that the product images are missing their associated product metadata. In this case, the user may be prompted (e.g., with a message for display on display 540 of user device 430) to manually identify one or more relevant fields on the webpage that corresponds to the associated product metadata. The trained machine learning algorithm may provide a best approximation of the product metadata such that some of the one or more relevant fields may be prefilled. In some embodiments, manual user feedback may be used to reinforce the machine learning algorithm to better identify associated product metadata in future implementations of the method.

Once all product images and their associated product metadata have been identified, the system may ingest the product images and metadata for storage in the product repository. The data in the product repository may be standardized to be independent of the format of the source webpage. This save the user valuable time that may be lost attempting to navigate various source webpages all with vastly different organizational structures. The product repository enables users searching for products across a multitude of sources to quickly and conveniently compare products of interest. Additionally, as the product repository is dynamically updated in response to any changes in status of the products, a user can near instantaneously find the most up to date information concerning the selected products.

The exemplary systems described herein provide a number of technological advantages over existing methods of monitoring online products, such as the ability to dynamically update the associated product metadata in substantially real-time without having to monitor or track every source website from which the products are ingested by the system. For example, the system may dynamically receive an update to the associated product metadata to inform a user that, e.g., the product in question has had a price change, or that a particular vehicle has been transferred from one dealership location to another dealership location.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner. While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    receiving a request to access a webpage, wherein the webpage comprises product metadata;
    analyzing the webpage, via a trained machine learning algorithm, to (i) determine whether one or more images on the webpage correspond to one or more product images and (ii) determine whether the webpage comprises product metadata corresponding to the one or more product images;
    responsive to determining (i) that the one or more images on the webpage correspond to one or more product images and (ii) that the one or more product images are missing product metadata associated with the one or more product images:
        prompting a user to manually identify one or more relevant fields on the webpage corresponding to the product metadata associated with the one or more product images; and
        ingesting the one or more product images and the product metadata associated with the one or more product images from the webpage based on the trained machine learning algorithm analysis and the manual identification;
    displaying the ingested one or more product images and the product metadata associated with the ingested one or more product images in a standardized format independent of a format of the webpage;
    receiving a user input based on an interaction with a first user input mechanism associated with a first ingested product image of the ingested one or more product images and a first ingested product metadata associated with the first ingested product image, the user input indicative of a selection of the first ingested product image and the first ingested product metadata;
    saving the first ingested product image and the first ingested product metadata into a product repository; and
    dynamically monitoring the first ingested product metadata stored in the product repository for changes.

2. The method of claim 1, wherein the one or more product images further comprise vehicle images and the trained machine learning algorithm is iteratively retrained based on the manual identification of the product metadata associated with the one or more product images to recognize the one or more relevant fields on the webpage as indicative of the product metadata.

3. The method of claim 2, wherein the product metadata comprises a make, a model, a year, a VIN, a product price, a mileage, a product location, a shipping fee, a webpage URL, or some combinations thereof.

4. The method of claim 1, further comprising:
    responsive to determining (i) that the one or more images on the webpage do not correspond to one or more product images and (ii) that the webpage does not comprise the product metadata associated with one or more product images, generating an error message indicating that no product images have been identified; and
    responsive to determining (i) that the one or more images on the webpage do not correspond to one or more product images and (ii) that the webpage comprises the product metadata, generating an error message indicating that no product images corresponding to the product metadata have been identified.

5. The method of claim 1, wherein displaying the ingested one or more product images and the product metadata associated with the one or more product images in the standardized format further comprises displaying the product metadata associated with each of the ingested one or more product images proximate to each of the ingested one or more product images.

6. The method of claim 1, further comprising generating a product recommendation based on the selection of the first ingested product image and the first ingested product metadata.

7. The method of claim 1, wherein the product metadata associated with the one or more product images may be based in part on the trained machine learning algorithm analysis determining a make, a model, a year, a VIN, a product price, a mileage, a product location, a shipping fee, a webpage URL, or some combinations thereof from processing the first ingested product image.

8. A method comprising:
    receiving a request to access a webpage, wherein the webpage comprises product metadata;
    analyzing the webpage, via a trained machine learning algorithm, to (i) determine that one or more images on the webpage correspond to one or more product images and (ii) determine that the webpage comprises product metadata corresponding to the one or more product images;
    ingesting the one or more product images and the product metadata corresponding to the one or more product images from the webpage based on the trained machine learning algorithm analysis;
    standardizing the ingested one or more product images and the product metadata associated with the one or more product images by identifying a first ingested product metadata for each of the ingested one or more product images;
    displaying the ingested one or more product images and the product metadata associated with the ingested one or more product images in a standardized format independent of a format of the webpage by displaying the identified first product metadata proximate to each of the ingested one or more product images;

receiving a user input based on an interaction with a first user input mechanism associated with a first ingested product image of the ingested one or more product images and a first ingested product metadata associated with the first ingested product image, the user input indicative of a selection of the first ingested product image and the first ingested product metadata;

saving the first ingested product image and the first ingested product metadata into a product repository; and dynamically monitoring the first ingested product metadata stored in the product repository for changes.

9. The method of claim 8, wherein the one or more product images and the product metadata further comprise vehicle images.

10. The method of claim 9, wherein the product metadata comprises a vehicle make, a vehicle model, a year, a VIN, a product price, a mileage, a product location, a shipping fee, a webpage URL, or some combinations thereof.

11. The method of claim 8, further comprising:
responsive to determining (i) that the one or more images on the webpage do not correspond to one or more product images and (ii) that the webpage does not comprise the product metadata associated with one or more product images, generating an error message indicating that no product images have been identified; and responsive to determining (i) that the one or more images on the webpage do not correspond to one or more product images and (ii) that the webpage comprises the product metadata, generating an error message indicating that no product images corresponding to the product metadata have been identified.

12. The method of claim 8, further comprising an indication on the webpage for whether the first ingested product image has already been saved into the product repository.

13. The method of claim 8, further comprising generating a product recommendation based on the selection of the first ingested product image and the first ingested product metadata.

14. The method of claim 8, wherein the product metadata may be based in part on the trained machine learning algorithm analysis determining a make, a model, a year, a VIN, a product price, a mileage, a product location, a shipping fee, a webpage URL, or some combinations thereof from processing the first ingested product image.

15. A method for dynamically ingesting and monitoring online products, comprising:
receiving a request to access a webpage, wherein the webpage comprises webpage metadata;

determining whether the webpage comprises a predetermined template, the predetermined template comprising instructions for locating and ingesting one or more product images and an associated product metadata of the webpage metadata;

responsive to receiving the predetermined template:
ingesting the one or more product images and the product metadata associated with the one or more product images from the webpage; and displaying the ingested one or more product images and the product metadata associated with the ingested one or more product images in a standardized format independent of a format of the webpage;

receiving a user input based on an interaction with a first user input mechanism associated with a first ingested product image and a first ingested product metadata associated with the first ingested product image, the user input indicative of a selection of the first ingested product image and the first ingested product metadata;

saving the first ingested product image and the first ingested product metadata into a product repository; and dynamically monitoring the first ingested product metadata stored in the product repository for changes.

16. The method of claim 15, wherein the one or more product images further comprise vehicle images and the associated product metadata further comprises a vehicle make, a vehicle model, a year, a VIN, a product price, a mileage, a product location, a shipping fee, a webpage URL, or some combinations thereof.

17. The method of claim 15, wherein the predetermined template comprises dynamic queries that may be in the form of regular expression, DOM query, or XPath query.

18. The method of claim 15, wherein displaying the ingested one or more product images and the product metadata associated with the one or more product images in the standardized format further comprises displaying the product metadata associated with each of the ingested one or more product images proximate to each of the ingested one or more product images.

19. The method of claim 15, further comprising generating a product recommendation based on the selection of the first ingested product image and the first ingested product metadata.

20. The method of claim 15, wherein the associated product metadata may be based in part on the trained machine learning algorithm analysis determining a make, a model, a year, a VIN, a product price, a mileage, a product location, a shipping fee, a webpage URL, or some combinations thereof from processing the first ingested product image.

* * * * *